United States Patent Office 3,534,048
Patented Oct. 13, 1970

3,534,048
2,2-DIMETHYL-4,4,6,6-TETRASUBSTITUTED-PIPER-
IDINE-1-OXIDE DERIVATIVES
Keisuke Murayama, Syoji Morimura, Takao Yoshioka,
Susumu Higasida, and Eiko Yamao, Tokyo, Japan, assignors to Sankyo Company Limited, Tokyo, Japan
No Drawing. Filed June 1, 1967, Ser. No. 642,678
Claims priority, application Japan, July 2, 1966,
41/43,124; June 15, 1966, 41/38,685; Aug. 15,
1966, 41/51,079
Int. Cl. C07d 29/30, 29/32
U.S. Cl. 260—293        10 Claims

ABSTRACT OF THE DISCLOSURE

Novel 2,2-dimethyl-4,4,6,6-tetrasubstituted-piperidine-1-oxide derivatives which are useful as stabilizers for polyolefins against deterioration resulting from exposure to light and some of which are also valuable as radiosensitizers. The 4-cyano-4-hydroxy-piperidine 1-oxide derivatives included within the present 2,2-dimethyl-4,6-disubstituted-piperidine-1-oxide derivatives are prepared by subjecting the 2,2-dimethyl-6,6-disubstituted-4-oxopiperidine-1-oxide derivatives to a conventional cyanohydrin synthesis means. The 4-amino (or substituted amino)-4-cyanopiperidine-1-oxide derivatives included within the present derivatives are prepared by reacting the said 4-cyano-4-hydroxy-piperidine-1-oxide derivatives with an amine. The 4-hydroxy-4-carbamoylpiperidine-1-oxide derivatives included within the present derivatives are prepared by subjecting the 2,2-dimethyl-6,6-disubstituted-4-oxopiperidine-1-oxide derivatives to a conventional cyanohydrin synthesis means followed by the treatment of the intermediate thus obtained with a peroxide.

---

This invention relates to a new class of piperidine-N-oxides and a process for the preparation of the same.

More particularly, it relates to the piperidine-N-oxide having the formula

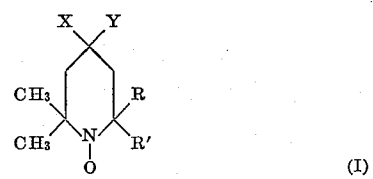

(I)

wherein

R and $R_1$, which may be the same or different, are alkyl group or, jointly together with the carbon atom to which they are attached, form a saturated 5- or 6-membered homocyclic ring or the group of the formula

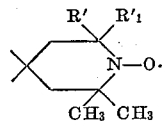

(wherein R′ and R′$_1$, which may be the same or different, are alkyl group or form a saturated 5- or 6-membered homocyclic ring, jointly together with the carbon atom to which they are attached);
X is cyano group or carbamoyl group; and
X is hydroxy group or the group of the formula

wherein $R_2$ and $R_3$, which may be the same or different, are hydrogen, alkyl group, aryl group or aralkyl group or, jointly together with the nitrogen atom to which they are attached, form a saturated 5- or 6-membered heterocyclic ring which may be further interrupted by any hetero atom other than the N atom); provided that X is cyano group or carbamoyl group when Y is hydroxy group, or X is cyano group when Y is the said group of the formula

Also, it relates to a process for the preparation of these piperidine-N-oxides having the above Formula I.

The piperidine-N-oxides (I) of this invention are novel compounds unknown in the prior art. They exhibit exceptionally high stabilizing effect against photodeterioration of polyolefins including, for example, polyethylene, polypropylene, other polyolefins such as polybutadiene and olefin copolymers such as ethylenepropylene copolymers, styrene-butadiene copolymers and acrylonitrile-butadiene-styrene copolymers. Thus, these novel piperidine-N-oxides are useful as light stabilizers for various polyolefins. Some of these piperidine-N-oxides having the above Formula I wherein X is carbamoyl group and Y is hydroxy group are also useful as excellent radiosensitizers for radiotherapy.

Accordingly, it is a principal object of this invention to provide new piperidine-N-oxide derivatives (I) which are useful as stabilizers for polyolefins against deterioration resulting from exposure to light and some of which are also excellent radiosensitizers. Another object of this invention is to provide a novel and commercially advantageous process for the preparation of the valuable piperidine-N-oxides having the above Formula I.

Specifically speaking, in one aspect of this invention, these piperidine-N-oxides (I) of this invention are contemplated to include three groups of piperidine-N-oxide derivatives, which derivatives can be represented by the following Formulae I-a, I-b and I-c, respectively; namely,

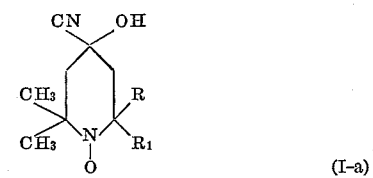

(I-a)

wherein R and $R_1$ are as defined above;

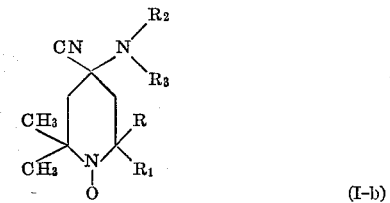

(I-b)

wherein R, $R_1$, $R_2$ and $R_3$ are as defined above; and

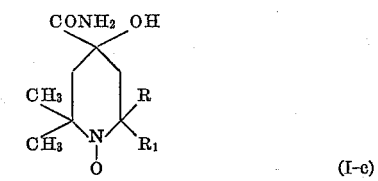

(I-c)

wherein R and $R_1$ are as defined above.

In the above Formula I, each of the R and $R_1$ may be illustratively represented by the following groups; methyl, ethyl, n-propyl, isopropyl, n-butyl, isobutyl, hexyl, octyl, decyl and dodecyl. The cyclic groups formed by the R and R₁ may be illustratively represented by the following groups;

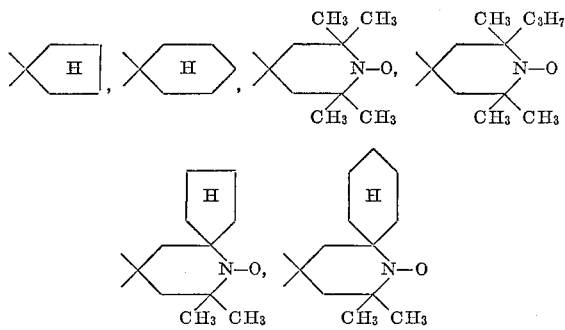

The group

may be illustratively represented by the following groups;

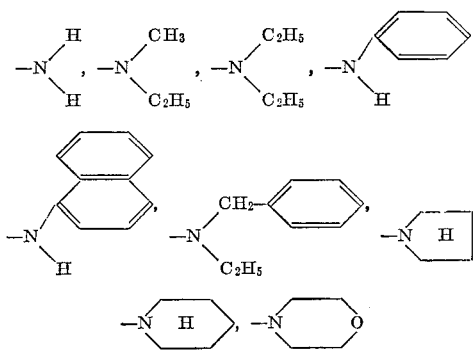

In another aspect of this invention, there is provided a new process for the preparation of the piperidine-N-oxides having the above Formula I. More specifically, the process for the preparation of these piperidine-N-oxides (I) includes three specific embodiments for the preparation of the piperidine-N-oxides (I); namely, a specific embodiment for preparing the piperidine-N-oxides (I-a), that for preparing the piperidine-N-oxides (I-b) and that for preparing the piperidine-N-oxides (I-c); these embodiments (hereinafter frequently referred to as "Process A," "Process B," and "Process C," respectively) being fully discussed hereinafter.

PROCESS A

In one specific embodiment of the process according to this invention, the piperidine-N-oxide of the above Formula I-a can be prepared by a novel process which comprises subjecting the piperidone-N-oxide having the formula

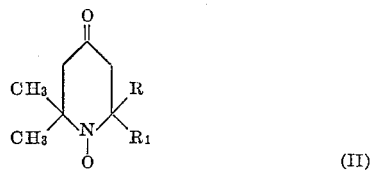

wherein R and R₁ are as defined above to a conventional means commonly employed in the art to form cyanohydrin, preferably those means essentially composed of the reaction with hydrogen cyanide or of the reaction with an alkali metal bisulfite followed by reaction with hydrogen cyanide or an alkali metal cyanide.

In carrying out this "Process A," there may be satisfactorily utilized any conventional procedure commonly employed in the art to form cyanohydrin. Representatives of various procedures in this process are the following:

(1) To an aqueous solution of the starting piperidone (II) and an alkali metal cyanide is added dropwise a dilute mineral acid or an organic acid at a lower temperature, e.g. about 0–10° C. Suitable examples of the alkali metal cyanide to be employed include sodium and potassium cyanides. Suitable examples of the mineral acid include hydrochloric and sulfuric acids and the like. Suitable examples of the organic acids include acetic acid and the like. There may be conveniently employed any of other mineral or organic acid which are known by those skilled in the art to be employable in a cyanohydrin synthesis.

(2) To the starting piperidone (II) is added dropwise hydrogen cyanide containing a minor amount or trace of an aqueous solution of an alkali metal cyanide at a lower temperature, e.g. about 0–5° C. and the resulting mixture is allowed to stand at a lower temperature, e.g. about 5–15° C., for a substantial period of time, e.g. about 5–10 hours.

(3) A mixture of the piperidone (II) and hydrogen cyanide is fed to a suitable charging column filled with a strongly basic ion exchange resin, e.g. Amberlite IRA–400 (trade name of one of strongly basic anion exchange resins manufactured and sold by Rohm & Haas Co., U.S.A.) and then this column is eluated with a suitable alcohol, e.g. methanol, ethanol and the like.

(4) To an aqueous (preferably, saturated) solution of an alkali metal bisulfite is added the starting piperidone (II) and the resulting mixture is allowed to stand. The crystalline substance (an addition compound) which separates, as such or after further purification with recrystallization technique, is added with stirring at ordinary temperature to hydrogen cyanide or an aqueous solution of an alkali metal cyanide.

These procedures as set forth above are given only for the purpose of illustration, and other procedures known in the art may also be employed in order to accomplish such a cyanohydrin synthesis in this invention.

The desired product, i.e. the piperidine-N-oxide of the above Formula I-a may be recovered from the reaction mixture and purified by a conventional means, e.g. filtration, extraction, recrystallization and/or any combination thereof.

The piperidones of the above Formula II which are employed as a starting material in this "Process A" are novel compounds with exception of 2,2,6,6-tetramethyl-4-oxopiperidine-1-oxide and these novel compounds can be easily obtained by a process which involves reaction of diacetone alcohol with a suitable ketone and ammonia in the presence of a Lewis acid to produce the corresponding piperidone derivatives followed by treatment of the latter with a suitable peroxide such as hydrogen peroxide or an organic peracid, as being illustrated by the following reaction schema

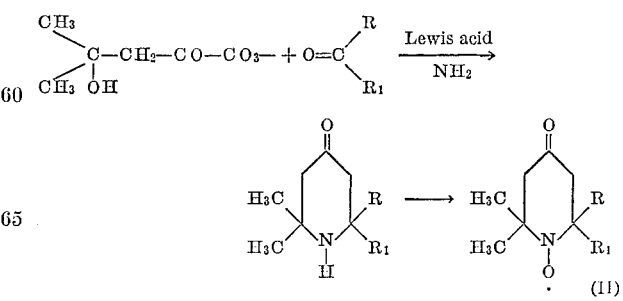

PROCESS B

In another specific embodiment of the process according to this invention, the piperidine-N-oxide of the above Formula I-b can be prepared by a novel process which comprises reacting the piperidine-N-oxide having the above Formula I-a with the amine derivative having the formula

  (III)

wherein $R_2$ and $R_3$ are as defined above.

In carrying out this "Process B," where the amine derivative (III) is in the form of a gas, the starting piperidine-N-oxide (I-a) is dissolved in a suitable inert organic solvent such as alcohols, e.g. methanol and ethanol and benzene and the like, and subsequently the gaseous amine derivative is introduced into the resulting solution with ice-cooling or at room temperature. Where the amine derivative (III) is in the form of a liquid, the reaction may be preferably conducted by reacting the starting piperidine-N-oxide (I-a) with the amine derivative in the optional presence of a suitable inert organic solvent such as alcohols, e.g. methanol and ethanol, benzene and the like with ice-cooling or at room temperature. Where the amine derivative (III) is in the form of a solid, the reaction may be preferably conducted in the presence of a suitable inert organic solvent such as those as mentioned above.

The desired product, i.e. the piperidine-N-oxide of the above Formula I-b may be recovered from the reaction mixture and purified by a conventional means, e.g. filtration, extraction, recrystallization and/or any combination thereof.

PROCESS C

In still another specific embodiment of the process according to this invention, the piperidone-N-oxide of the above Formula I-c can be prepared by a novel process which involves two steps, i.e. the first step which comprises subjecting the piperidone-N-oxide having the formula

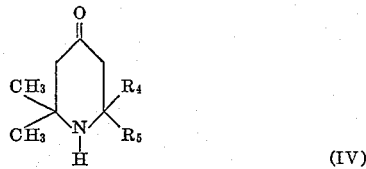 (IV)

wherein $R_4$ and $R_5$, which may be the same or different, are alkyl group or, jointly together with the carbon atom to which they are attached, form a saturated 5- or 6-membered homocyclic ring or the group of the formula

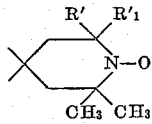

or

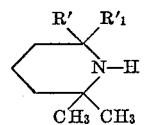

(wherein R' and $R'_1$ are as defined above) to a conventional means commonly employed in the art to form cyanohydrin, thereby to produce the piperidine cyanohydrin having the formula

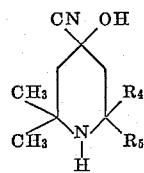 (V)

wherein $R_4$ and $R_5$ are as defined above and the second step which comprises treating the latter compound (V) obtained in the first step with a peroxide to form the desired piperidine-N-oxide (I-c).

In carying out this "Process C," the first step as described above may be satisfactorily conducted by utilizing any conventional procedure commonly employed in the art to form cyanohydrin. Those representative procedures, recovery of the final product and the like as fully described in the above "Process A" may be correspondingly and conveniently applied to this step.

The second step in this "Process C" may be preferably conducted by treating the piperidine cyanohydrin (V) obtained in the said first step with a peroxide. Suitable examples of the peroxide to be employed in this step include hydrogen peroxide, an organic peracid and the like. Suitable examples of the organic peracid are peracetic acid, perbenzoic acid, substituted-perbenzoic acids and the like.

Where hydrogen peroxide is employed as an oxidizing agent in this step, it is preferable to conduct oxidation reaction in the presence of a catalyst for oxidation, more preferably together with a promoter, since the increased yield of the desired product may be obtained. There may be satisfactorily employed any of those catalysts for oxidation and promoters commonly utilized in the art for oxidation, but alkali metal salts of such inorganic acid as tungstic, phosphotungstic and phosphomolybdic acids and vanadium oxide are preferable as a catalyst and ethylenediaminetetraacetic acid as a promoter. In this case, the reaction of this step may also be conducted in the presence of a suitable reaction solvent such as water and inert organic solvents, e.g. methanol, acetic acid, and the like. The reaction temperature and period are not critical, but the reaction is usually conducted at ordinary temperature, and preferably at a higher temperature up to about 50° C. by heating in order to promote the reaction proceeding, for about 10–30 hours.

Where an organic peracid is employed as an oxidizing agent, the reaction may be conveniently conducted at ordinary temperature, but it may be more preferable to employ any external cooling means to bout 0–10° C. during the addition of an organic peracid, since the reaction may initially be exothermic. The reaction may also be preferably conducted in the presence of a suitable reaction solvent for instance, preferable being water, acetic acid, ethyl acetate, methylene chloride and the like for peracetic acid and ether, benzene, chloroform and the like for perbenzoic acid and substituted-perbenzoic acid.

The desired product, i.e. the piperidine-N-oxide of the above Formula I-c may be preferably recovered from the reaction mixture, for instance, by admixing either the crystalline substance collected by filtration, if separated out in situ, or the reaction mixture, if not, with a saturated aqueous solution of a suitable alkali such as hydroxides and carbonates of sodium, potassium, calcium and barium and the like at ordinary temperature for about 1-3 hours, extracting the resulting mixture with a suitable organic solvent such as benzene, ether, methyl ethyl ketone and the like and then removing the solvent by distillation. The crude product thus obtained may be further purified, for instance, by recrystallization from a suitable organic solvent such as methanol, benzene, methyl ethyl ketone and the like, if desired.

In the latter step, it will be noted that the group of the formula

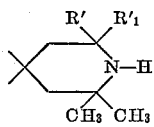

(wherein R' and $R'_1$ are as defined above) within the definition of the $R_4$ and $R_5$ in the Formula IV representing the starting piperidone be converted by oxidation to the group of the formula

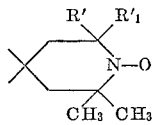

(wherein R' and R'$_1$ are as defined above).

The piperidones of the above Formula IV which are employed as a starting material in this "Process C" are novel compounds with exception of triacetonamine (2,2,6,6-tetramethyl-4-oxopiperidine) and these novel compounds can be easily obtained by a process which involves reaction of diacetone amine with a suitable ketone in the presence of an inorganic salt such as calcium chloride and the like, as being illustrated by the following reaction schema.

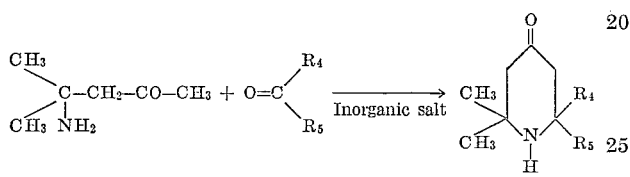

The specific embodiments as disclosed above will be illustrated by the following reaction schema:

PROCESS A

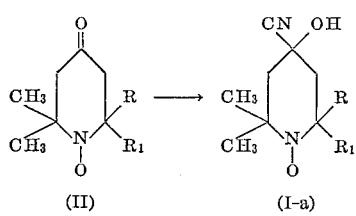

PROCESS B

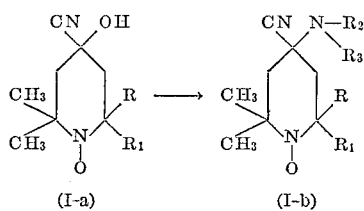

PROCESS C

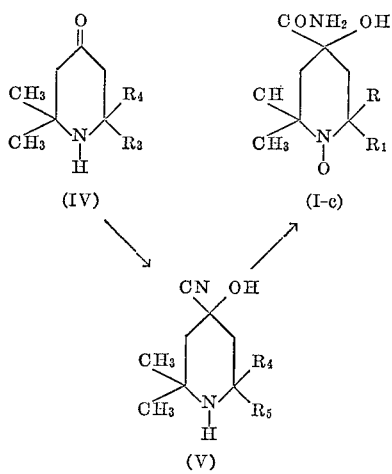

The following examples are given for the purpose of illustrating this invention, but they should not be construed to be limiting the scope thereof.

The Examples 1 through 4 will illustratively describe the preparation of the piperidine-N-oxide having the above Formula I-a of this invention, the Examples 5 through 7 the preparation of the piperidine-N-oxide having the above Formula I-b of this invention and the Examples 8 through 10 the preparation of the piperidine-N-oxide having the above Formula I-c of this invention.

Example 1.—Preparation of 2,2,6,6-tetramethyl-4-cyano-4-hydroxypiperidine-1-oxide To a solution of 5 g. of 2,2,6,6-tetramethyl-4-oxopiperidine-1-oxide and 2.1 g. of sodium cyanide in 20 ml. of water was added dropwise at 5–8° C. over 2–3 hours an aqueous sulfuric acid solution comprising 1.9 g. of sulfuric acid and 10 ml. of water, with stirring and ice-cooling. After completion of the dropwise addition, the stirring was continued for additional 20 minutes. The crystalline substance which separated out was recovered by filtration and washed with iced water and then cold benzene. After drying under reduced pressure, the dried substance was recrystallized from methyl ethyl ketone to give the desired product as pale orange crystals melting at 98–99° C.

Analysis.—Calculated for $C_{10}H_{17}O_2N_2$ (percent): C, 60.89; H, 8.69; N, 14.20. Found (percent): C, 60.75; H, 8.85; N, 14.10. Molecular weight—Calculated: 197.25. Found (osmometer): 198.2.

The electron spin resonance spectrum (in $C_6H_6$) of the piperidine-1-oxide thus obtained showed a strong triplet of a hyperfine coupling constant 16.3 oersted, which would be split by the interaction of the unpaired electron spin with nuclear spin of the N atom in the product. This result evidently demonstrates the presence of N-oxide free radical in the product.

Example 2.—Preparation of 1-aza-2,2-dimethyl-4-cyano-4-hydroxy-spiro (5.5)undecane-1-oxide To 3.1 g. of 1-aza-2,2-dimethyl-4-oxo-spiro-(5.5) undecane-1-oxide was added dropwise 4 g. of hydrogen cyanide containing one drop of an aqueous potassium cyanide solution while maintaining at 3–5° C. and the resulting mixture was allowed to stand at 5–10° C. for 8 hours. The crystalline substance which separated out was recovered by filtration, washed with iced water and then cold benzene and finally recrystallized from diisopropyl ether to give the desired product melting at 82–83° C.

Analysis.—Calculated for $C_{13}H_{21}N_2O_2$ (percent): C, 65.74; H, 8.92; N, 11.81. Found (percent): C, 65.68; H, 9.03; N, 11.74.

Example 3.—Preparation of 2,2,6,6-tetramethyl-4-cyano-4-hydroxypiperidine-1-oxide A mixture of 5 g. of 2,2,6,6-tetramethyl-4-oxopiperidine with a substantial amount of a saturated aqueous sodium bisulfite solution was vigorously shaken under ice-cooling for a while. The crystalline substance which separated out was recovered by filtration and washed with ether. With vigorous stirring, the substance was added to a solution of 2.1 g. of sodium cyanide in 5 ml. of water. The crystalline substance which separated out was recovered by filtration, washed with iced water and recrystallized from aqueous methanol to give the desired product, which was then identified with that of the above Example 1 by a mixed melting point.

Example 4.—Preparation of 1,9-diaza-2,2,8,8,10,10-hexamethyl-4-cyano-4-hydroxy - spiro (5.5) undecane-1,9-dioxide To a solution of 4.2 g. of 1,9-diaza-2,2,8,8,10,10-hexamethyl-4-oxo-spiro (5.5) undecane-1,9-dioxide and 1.1 g. of sodium cyanide in 12 ml. of water was added dropwise at 3–7° C. an aqueous sulfuric acid comprising 0.9 g. of sulfuric acid and 7 ml. of water, while maintaining stirring and ice-cooling. After completion of the dropwise addition, the stirring was continued for additional 30 minutes. The crystalline substance which separated out was recovered by filtration, washed with water and then recrystallized from aqueous methanol to give the desired product.

Similarly, there were obtained the following piperidine-N-oxides:

2,2,6-trimethyl-6-isobutyl-4-cyano-4-hydroxypiperidine-1-oxide;

2,2,6-trimethyl-6-n-hexyl-4-cyano-4-hydroxypiperidine-1-oxide;

2,2-dimethyl-6,6-diisobutyl-4-cyano-4-hydroxy-piperidine-1-oxide;

2,2-dimethyl-6,6-di-n-dodecyl-4-cyano-4-hydroxy-piperidine-1-oxide; and 6-aza-7,7-dimethyl-9-cyano-9-hydroxy-spiro (4.5) decane-1-oxide;

Example 5.—Preparation of 2,2,6,6-tetramethyl-4-amino-4-cyanopiperidine-1-oxide

Through a solution of 4.2 g. of 2,2,6,6-tetramethyl-4-hydroxy-4-cyanopiperidine-1-oxide in 50 ml. of methanol was bubbled ammonia gas with ice-cooling for 6 hours and then at ambient temperature for 6 hours. Then, the methanol was distilled off under reduced pressure and the residue was recrystallized from 70% aqueous methanol to give the desired product melting at 129–130° C.

Analysis.—Calculated for $C_{10}H_{18}ON_3$ (percent): C, 61.19; H, 9.24; N, 21.41. Found (percent): C, 60.99; H, 9.16; N, 21.42.

Example 6.—Preparation of 2,2,6,6-tetramethyl-4-cyano-4-benzylamino-piperidine-1-oxide A mixture of 2 g. of 2,2,6,6-tetramethyl-4-cyano-4-hydroxypiperidine-1-oxide and 1.2 g. of benzylamine was stirred at room temperature. The crystalline substance which separated out was recovered by filtration and then recrystallized from petroleum benzine to give the desired product melting at 90–91° C.

Analysis.—Calculated for $C_{17}H_{24}ON_3$ (percent): C, 71.29; H, 8.45; N, 14.67. Found (percent): C, 71.03; H, 8.61; N, 14.74.

Example.—Preparation of 1-aza-2,2-dimethyl-4-n-butylamino-4-cyano-spiro (5.5) undecane-1-oxide To a solution of 2.4 g. of 1-aza-2,2-dimethyl-4-hydroxy-4-cyano-spiro (5.5) undecane-1-oxide in 10 ml. of ether was added 0.8 g. of n-butylamine and the resulting mixture was stirred at room temperature for 3 days. The ether was distilled off and the residual solution was cooled, thereby to separate a crystalline substance, which was then recrystallized from petroleum ether to give the desired product melting at 36–38° C.

Analysis.—Calculated for $C_{17}H_{30}ON_3$ (percent): C, 69.82; H, 10.34; N, 14.37. Found (percent): C, 69.71; H, 10.15; N, 14.23.

Similarly, there were obtained the following piperidine-N-oxides:

2,2,6,6-tetramethyl-4-diethylamino-4-cyanopiperidine-1-oxide;

2,2,6,6-tetramethyl-4-α-naphthylamino-4-cyano-piperidine-1-oxide;

1-aza-2,2-dimethyl-4-diethylamino-4-cyano-spira (5.5) undecane-1-oxide; and 1,9-diaza2,2,8,8,10,10-hexamethyl-4-morpholino-4-cyano-spiro (5.5) undecane-1,9-dioxide.

Example 8.—Preparation of 2,2,6,6-tetramethyl-4-hydroxy-4-carbamoyl-piperidine-1-oxide (a) To a solution of 10 g. of triacetonomine (i.e., 2,2,6,6-tetramethyl-4-oxopiperidine) and 3.5 g. of sodium cyanide in 20 ml. of water was added dropwise at 7–10° C. over 2–3 hours an aqueous sulfuric acid solution comprising 3.5 g. of sulfuric acid and 15 ml. of water while maintaining ice-cooling and stirring. After completion of the dropwise addition the stirring was continued for additional 20 minutes. The crystalline substance which separated out was recovered by filtration, washed with iced water and then dried under reduced pressure. The substance thus obtained was recrystallized from a mixture of methyl ethyl ketone and petroleum benzine to give 2,2,6,6 - tetramethyl-4-hydroxy-4-cyano-piperidine, melting at 126° C. (with decomposition).

Analysis.—Calculated for $C_{10}H_{18}ON_2$ (percent): C, 65.89; H, 9.96; N, 15.37. Found (percent): C, 65.60; H, 10.02; N, 15.20.

(b) To a solution of 1.6 g. of the 2,2,6,6-tetramethyl-4-hydroxy - 4 - cyanopiperidine obtained as described above, 0.03 g. of sodium tungstate and 0.04 g. of ethylenediaminetetraacetic acid in 10 ml. of methanol was added 3 ml. of 30% hydrogen peroxide with stirring. The stirring was continued at ambient temperature for 16 hours. Then, the methanol was distilled off under reduced pressure and potassium carbonate was added to the residue with ice-cooling in a sufficient amount to come to a saturation. The saturated mixture was then stirred at ambient temperature for 3 hours. The resulting mixture was extracted several times with methyl ethyl ketone and the combined extracts were dried over anhydrous potassium carbonate. After removal of the solvent by distillation, the crystalline residue was recrystallized from benzene to give the desired product, melting at 226–227° C.

Analysis.—Calculated for $C_{10}H_{19}O_2N_2$ (percent): C, 55.79; H, 8.90; N, 13.01. Found (percent): C, 55.75; H, 9.12; N, 12.98.

The electron spin resonance spectrum (in $C_6H_6$) of this latter product showed a strong triplet of a hyperfine coupling constant 16.3 oersted, which would be split by the interaction of the unpaired electron spin with nuclear spin of the N atom in the molecule. This result evidently demonstrates the presence of N-oxide free radical in the product.

Example 9.—Preparation of 1,9 - diazo - 2,2,8,8,10,10-hexamethyl - 4 - hydroxy - 4-carbamoyl-spiro (5.5) undecane-1,9-dioxide (a) To a solution of 2.5 g. of 1,9-diaza-2,2,8,8,10,10-hexamethyl-4-oxo-spiro (5.5) undecane and 1 g. of sodium cyanide in 12 ml. of water was added dropwise at 7–10° C. a solution of 0.9 g. of sulfuric acid in 5 ml. of water maintaining ice-cooling and stirring. After completion of the dropwise addition, the stirring was continued for additional 20 minutes. After cooling to 2–5° C., the crystalline substance which separated out was removed by filtration, washed with iced water, dried and then recrystallized from methyl ethyl ketone to give 1,9-diaza-2,2,8,8,10,10 - hexamethyl - 4 - cyano-4-hydroxy-spiro (5.5) undecane.

(b) To a solution of 2.8 g. of the 1,9-diaza-2,2,8,8,10,10-hexamethyl-4-cyano-4 - hydroxy-spiro (5.5) undecane obtained as described in 10 ml. of acetic acid was added dropwise to 40 ml. of a 8% peracetic acid solution in acetic acid while maintaining ice-cooling and stirring. After completion of the dropwise addition, the stirring was continued with ice-cooling for additional 1 hour and then at ambient temperature for additional 24 hours. Then, the reaction mixture was concentrated to about 15 ml. volume under reduced pressure, made alkaline by the addition of a saturated aqueous sodium carbonate solution and the alkaline mixture was stirred at ambient temperature for 2 hours. The reaction mixture was extracted several times with methyl ethyl ketone, the combined extracts were dried over anhydrous sodium sulfate. The solvent was distilled off and the crystalline residue was recrystallized from methyl ethyl ketone to give the desired product.

Example 10.—Preparation of 2,2,6-trimethyl-4-hydroxy-4-carbamoyl-6-isobutylpiperidine-1-oxide (a) A mixture of 5.8 g. of 2,2,6-trimethyl-6-isobutyl-4-oxopiperidine with an appropriate amount of a saturated aqueous sodium bisulfite solution was vigorously shaken for a while. The crystalline substance which separated out was recovered by filtration and washed with ether. The substance thus obtained was added with vigorous stirring to a solution of 5.8 g. of potassium cyanide in 10 ml. of water. The crystalline substance which separated out was recovered by filtration, washed with iced water and recrystallized from aqueous methanol to give 2,2,6-trimethyl-4-hydroxy-4-cyano-6-isobutyl-piperidine.

(b) To a solution of 2.0 g. of the 2,2,6-trimethyl-4-hydroxy-4-cyano-6-isobutylpiperidine obtained as described above, 0.03 g. of sodium tungstate and 0.04 g. of ethylenediaminetetraacetic acid in 10 ml. of methanol was added with stirring 3 ml. of 30% hydrogen peroxide. The resulting mixture was stirred at ambient temperature for 20 hours. The methanol was distilled off under reduced pressure and a substantial amount of potassium carbonate to come to a saturation was added to the residual solution with ice-cooling. The resulting mixture was stirred for 3 hours and then extracted several times with methyl ethyl ketone. The combined extracts were dried over anhydrous potassium carbonate and the solvent was distilled off. The crystalline residue was recrystallized from a mixture of methyl ethyl ketone with petroleum benzine to give the desired product.

Similarly, there were obtained the following piperidine-N-oxides:

2,2,6-trimethyl-6-n-hexyl-4-hydroxy-4-carbamoyl-piperidine-1-oxide;

1-aza-2,2-dimethyl-4-hydroxy-4-carbamoyl-spiro (5.5) undecane-1-oxide; and 6-aza-7,7-dimethyl-9-hydroxy-9-carbamoyl-spiro (4.5) decane-6-oxide.

What is claimed is:
1. A compound having the formula

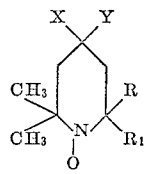

wherein

R and $R_1$, which may be the same or different, are alkyl of 1 to 12 carbon atoms or, jointly together with the carbon atom to which they are attached, form 1,1-cyclopentyl, 1,1-cyclohexyl or the group

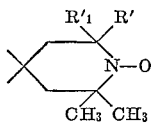

wherein $R'$ and $R'_1$, which may be the same or different, are alkyl of 1 to 3 carbon atoms or form 1,1-cyclopentyl or 1,1-cyclohexyl, jointly together with the carbon atom to which they are attached;

X is cyano or carbamoyl; and

Y is hydroxy when X is cyano or carbamoyl group, or the group of the formula

wherein $R_2$ and $R_3$, which may be the same or different, are hydrogen, methyl, ethyl, phenyl, naphthyl, benzyl or, jointly together with the nitrogen atom to which they are attached, form pyrrolidino, piperidino or morpholino when X is cyano.

2. 2,2,6,6-tetramethyl - 4 - cyano-4-hydroxy-piperidine-1-oxide.

3. 1-aza-2,2-dimethyl-4-cyano-4-hydroxy-spiro (5.5) undecane-1-oxide.

4. 1,9-diaza-2,2,8,8,10,10 - hexamethyl - 4 - cyano-4-hydroxy-spiro (5.5) undecane-1,9-dioxide.

5. 2,2,6,6 - tetramethyl-4-amino-4-cyano-piperidine-1-oxide.

6. 2,2,6,6-tetramethyl-4-cyano-4-benzylaminopiperidine-1-oxide.

7. 1-aza-2,2-dimethyl - 4-n-propylamino-4-cyano-spiro (5.5) undecane-1-oxide.

8. 2,2,6,6-tetramethyl-4-hydroxy - 4 - carbamoyl-piperidine-1-oxide.

9. 1,9-diaza - 2,2,8,8,10,10 - hexamethyl-4-hydroxy-4-carbamoyl-spiro (5.5) undecane-1,9-dioxide.

10. 2,2,6-trimethyl-4 - hydroxy - 4-carbamoyl-6-isobutyl-piperidine-1-oxide.

References Cited
FOREIGN PATENTS
837,747   6/1960   Great Britain.

OTHER REFERENCES

Cram et al.: Organic Chemistry, 2nd Ed., McGraw-Hill, New York, N.Y., pp. 305–6 (1966).

O. L. Lebedev et al.: Zhur Obshchei Khim. 30 (5), 1631–5 (1960).

HENRY R. JILES, Primary Examiner

G. T. TODD, Assistant Examiner

U.S. Cl. X.R.

260—45.8, 247.2, 247.5, 294, 294.7